UNITED STATES PATENT OFFICE.

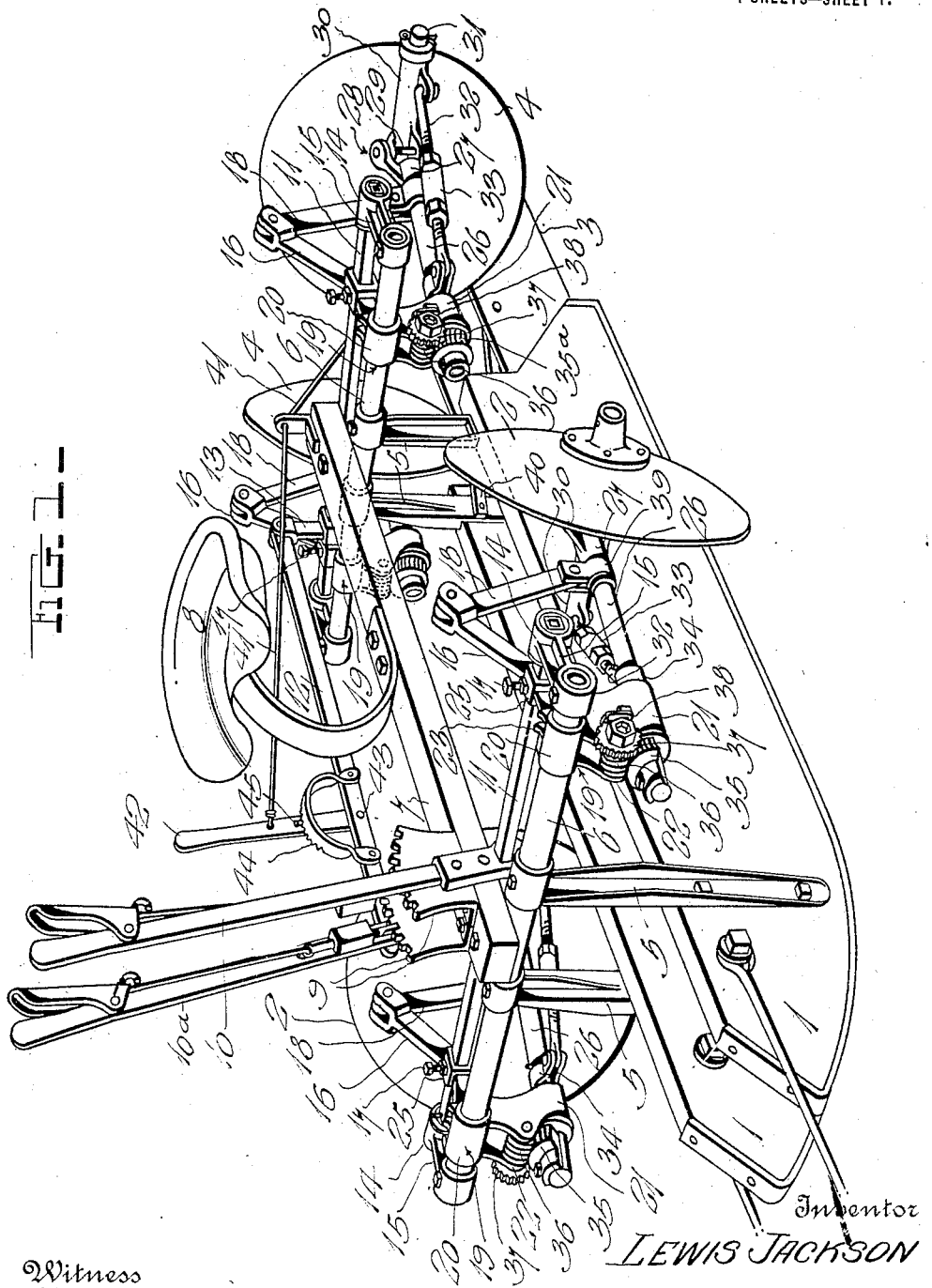

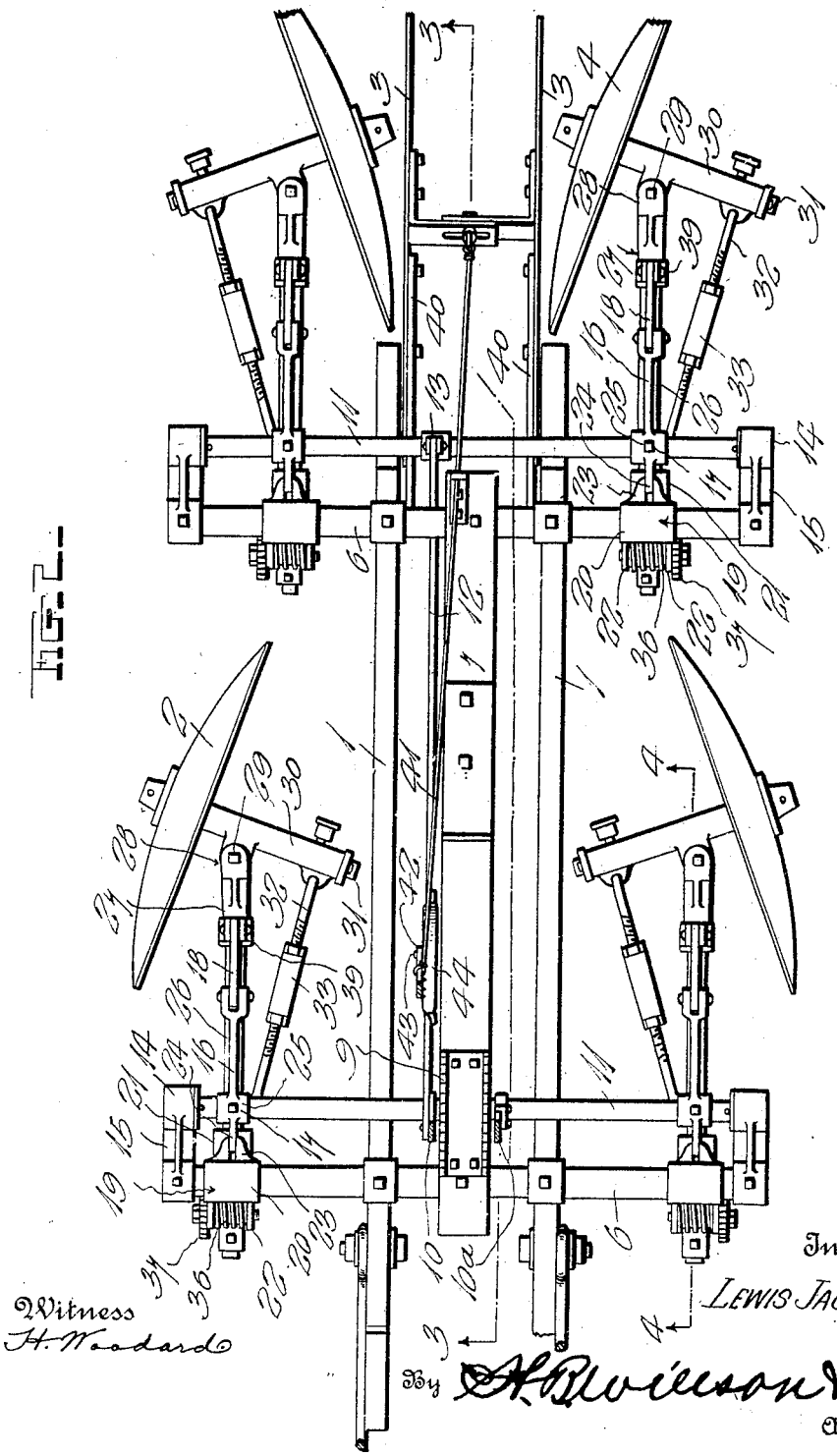

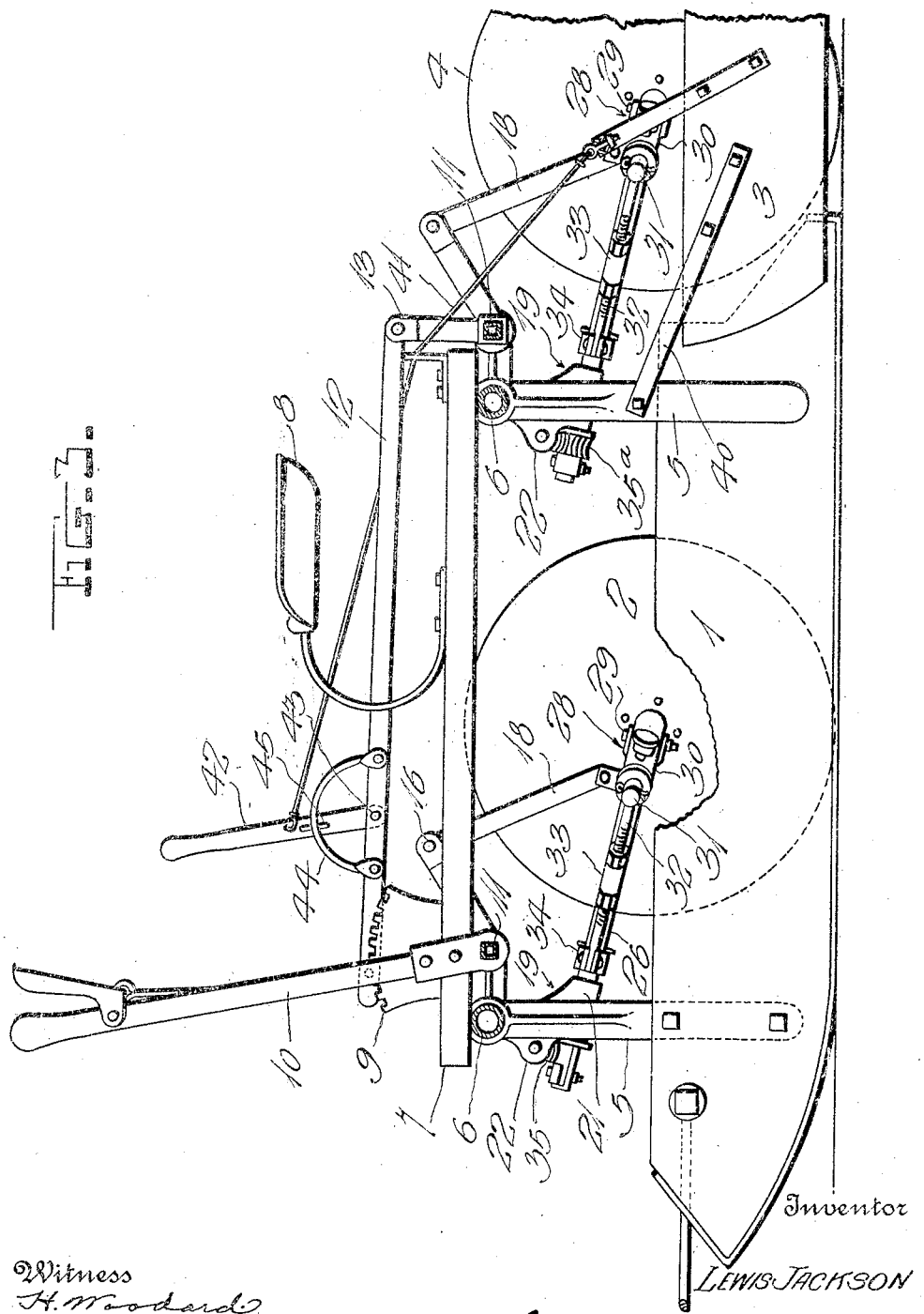

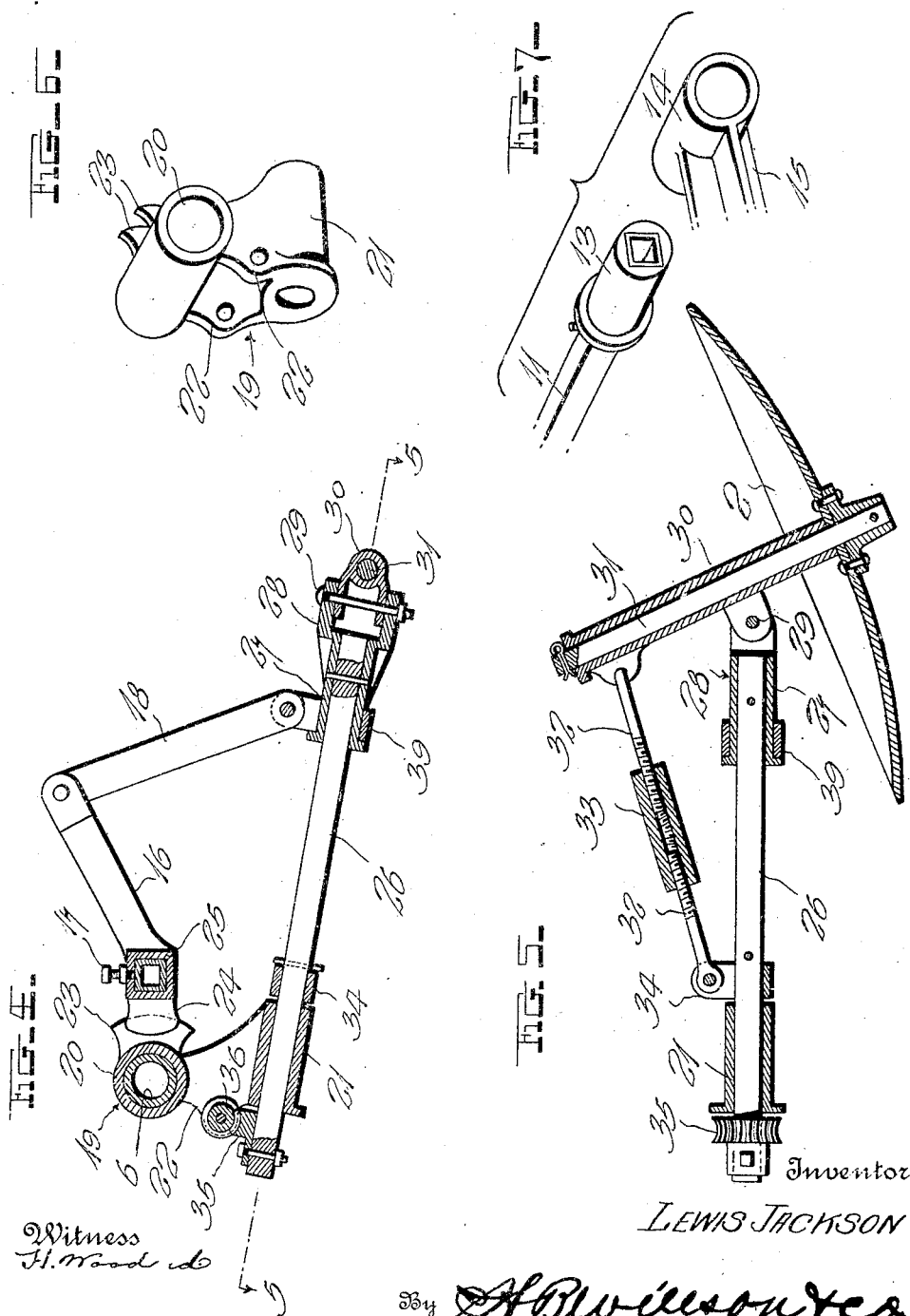

LEWIS JACKSON, OF SIMPSON, KANSAS.

LISTER-CULTIVATOR.

1,382,364.          Specification of Letters Patent.     Patented June 21, 1921.

Application filed March 13, 1919. Serial No. 282,270.

*To all whom it may concern:*

Be it known that I, LEWIS JACKSON, citizen of the United States, residing at Simpson, in the county of Mitchell and State of Kansas, have invented certain new and useful Improvements in Lister-Cultivators; and I do declare the following to be a full, clear, and exact description of the invention, such as will enable others skilled in the art to which it appertains to make and use the same.

My invention relates to improvements in lister cultivators and one object thereof is the provision of an implement which, when cultivating the crop for the first time will pulverize the earth from the ridges, throw it into the hollows, deposit the proper amount of the pulverized earth around the sprouting plants, and return the remainder of the earth to the ridges, thus not only properly working the rows of products and ridding the field of weeds, but placing the earth of the ridges in better shape for use when cultivating the second time.

A further object is to provide a machine which, by simple adjustment, may be used for throwing all of the earth from the ridges around the plants when the latter have gained sufficient size and the field is cultivated for the second time.

Still further objects are to provide for quick, easy and accurate adjustment to obtain the best results; to provide a novel arrangement of fenders and adjusting means therefor; and to provide a machine which will be highly efficient and durable in all respects, though rather simple and inexpensive to manufacture.

With the foregoing in view, the invention resides in the several novel features of construction and unique combinations of parts hereinafter fully described and claimed, reference being made to the accompanying drawings which form a part of this application.

Figure 1 is a perspective view of a cultivator constructed in accordance with my invention.

Fig. 2 is a top plan view.

Fig. 3 is a longitudinal section on the plane of the line 3—3 of Fig. 2.

Fig. 4 is an enlarged detail longitudinal section on the plane indicated by the line 4—4 of Fig. 2.

Fig. 5 is a horizontal section on the plane of the line 5—5 of Fig. 4.

Fig. 6 is a perspective view of one of the bearing members to be described.

Fig. 7 is a perspective view showing the manner in which the transverse rock shafts are mounted.

Briefly speaking, the machine consists of a pair of parallel runners 1 adapted to straddle the rows of plants one at a time; front disks 2 to pulverize the earth in the ridges alongside the rows, throw such earth inwardly, and pile it against the runners 1, whereby some of this earth may fall inwardly behind the runners around the sprouting plants; a pair of fenders 3 for controlling the amount of earth falling behind the runners, and a pair of rear disks 4 for returning the remaining earth to the ridges when cultivating for the first time, said rear disks, however, being reversible so as to throw the earth farther inward along the row, when the plants have gained sufficient size and are cultivated for the second time.

The runners 1 are of any adequate construction, being by preference of wood provided with metal shoes. Suitable posts 5 are rigidly secured to and rise from the front and rear ends of the runners and carry front and rear transverse bars 6 which are by preference formed of piping. The two bars 6 are connected by a central longitudinal beam 7 supporting the driver's seat 8 and segments 9 for holding a pair of levers 10 and 10ª in adjusted position, said levers being provided for controlling the transverse rock shafts 11 which are located immediately in rear of the transverse bars 6. The lever 10 is directly mounted on the front shaft 11, while lever 10ª is connected by a longitudinal bar or link 12 with a crank arm 13 rising from the rear shaft. Due to the construction and arrangement to be described, the operation of lever 10 will raise and lower the front disks 2 as required and the rear disks 4 may be similarly shifted by the lever 10ª.

The rock shafts 11 may be of any preferred construction and mounted in any adequate manner, but they are by preference of hollow rectangular formation and are provided on their ends with bushings 13 rotatable in bearings 14 on the rear ends of bracket arms 15 which are rigidly secured to the ends of the transverse bars 6. Each shaft 11 is provided with crank arms 16 adjustable longitudinally thereon and provided with set screws 17 for holding them in adjusted position; and from said crank arms, links 18 depend to raise and lower the disks as required.

Bearing members 19 (detailed in Fig. 6) are provided, having upper transverse bearings 20 slidable on the bars 6, lower longitudinal bearings 21, and transverse intermediate bearings 22. The bearings 20 are provided with parallel vertical ribs 23 which receive therebetween vertical ribs 24 on the slides 25 which carry the crank arms 16. By this arrangement, the set screws 17 not only lock the arms 16 in adjusted position, but correspondingly hold the slides or bearings 20, so that the proper relative positions at all times exist.

Longitudinal arms 26 have their front ends rotatably mounted in the bearings 21 while their rear ends are secured in the hubs 27 of forks 28, these forks being pivoted at 29 to transverse tubular bearings 30 carrying the axles 31 upon which the disks 2 and 4 are mounted. By means of rods 32 and turn buckles 33, the ends of the bearings 30 remote from the disks, are connected with suitable collars or the like 34 on the arms 26, whereby the oblique positions of the disks may be varied quickly and accurately as required by adjustment of the turn buckles; and the vertical positions of the disk may be varied by turning the aforesaid arms 26 in the bearings 21. The front and rear arms 26 may be provided with any kind of worms and gears for rotating them, but I have shown such arms equipped respectively with worm gear segments 35 and worm gears 35$^a$, said segments and gears meshing with worms 36 which are rotatably mounted in the transverse bearings 22. The worms 36 may be turned by hand or by the use of a suitable wrench and in the present form of the invention are shown provided with toothed wheels 37 with the teeth of which springs 38 coact to hold the worms in adjusted position, while offering little resistance to adjustment thereof when required. It is never necessary to rotate the front arms 36 throughout a complete revolution, whereas in order to reverse the rear disks 4, the rear arms 26 must be so rotated as to turn the disks completely over when said disks are to be set for throwing the earth inwardly toward the row instead of returning it to the ridges. For these reasons, it is necessary to employ complete gears 35$^a$ on the rear arms whereas segments are all that are required on the others. The hubs 27 on the rear ends of the arms 26 rotate within collars 39 to which the lower ends of the links 18 are pivoted and it will thus be seen that these links are in position to raise or lower the arms as required regardless of the adjusted positions of said arms 26.

The fenders 3 are carried by arms 40 pivoted to the rear posts 5 and by means of a wire or the like 41 leading to a hand lever 42, said fenders may be raised or lowered as required to allow the proper amount of earth to pass thereunder and fall around the small plants when initially cultivating. The lever 42 is fulcrumed at 43 on the longitudinal bar 12 above described and is normally held against rocking upon its fulcrum, by a suitable rack 44 which engages a dog 45 carried by the lever. Operation of the lever 42 will adjust the fenders 3 vertically irrespective of any movement on the part of the disks 4, while operation of the lever 10$^a$ to raise said disks 4, will bodily move said lever 42, thus operating the wire or other connection 41 to simultaneously raise the fenders.

In operation, when the field is being cultivated for the first time, the disks are set as illustrated in Figs. 1, and 2, and by the several adjusting means above described, the disks in question are so adjusted as to prevent side draft in one direction or the other, and it is to be observed that these adjustments are made by simply turning the worms 36 and the turn buckles 33. The runners 1 straddle the row of sprouting plants and the disks are lowered to operative position by movement of the levers 10 and 10$^a$, the bearing members 19 then rocking upon the bearings 20 as the arms are depressed by means of the crank arms 16 and links 18. The fenders 3 are properly adjusted by means of the lever 42 and when the machine is now drawn forwardly, it will operate as follows: The disks 2 pulverize the earth of the ridges alongside the row, throw the pulverized earth inwardly, and pile it against the runners 1, so that some of this earth may fall inwardly at the ends of the runners, around the sprouting plants, the amount of earth deposited around the plants being controlled by the fenders 3. The remaining earth is returned to the ridges by the disks 4 and during this return, the earth is further pulverized. It will thus be seen that the rows of plants are properly worked, that the field is cleared of weeds, and that the earth of the ridges is placed in better shape for use when cultivating the second time. When this second cultivation is done, the rear arms 26 are rotated a complete revolution so that the disks 4 then stand in planes approximately parallel with those in which the disks 2 are operating, and the slides 20 and 25 are then adjusted to the proper extent to allow the rear disks to throw the pulverized earth moved inwardly by the front disks, farther inward along the row. Before the second cultivating is done, the plants are of sufficient size to prevent injury by the full amount of earth being thrown around them and consequently the entire ridge at each side of the row may be leveled upon this second operation.

The machine is comparatively simple and inexpensive, is extremely easy to operate and to adjust in such a manner as to obtain the best results, and has proven highly efficient under most trying circumstances. For these reasons, I prefer to employ the several details shown and described, but it is to be understood that within the scope of the invention as claimed, numerous minor changes might well be made. Also, it is to be taken into consideration that the machine may well be provided with wheels if desired; may be so made as to cultivate a plurality of rows simultaneously, and can be used for cultivating numerous crops and also in preparing the ground before the crops are planted. Since it is common to provide lister cultivators with wheels and to connect several identical units by a transverse frame structure to cultivate a number of rows at the same time, I do not deem it necessary to illustrate these features, but wish it clearly understood that my invention is not restricted to a machine which is totally supported by runners or which cultivates only one row.

I claim:

1. In a lister cultivator, a pair of wall-like runners adapted to straddle a row of sprouting plants, means for pulverizing the earth of the ridges alongside the row, throwing such earth inwardly, and piling it against the runners, whereby some of the pulverized earth may fall behind said runners around the plants; and a pair of disks adapted to be set to return the remaining pulverized earth to the ridges, said disks being reversible to throw such remaining earth farther inward around the plants when cultivating the second time.

2. In a lister cultivator, a pair of runners adapted to straddle a row of sprouting plants, means for pulverizing the earth of the ridges alongside the row, throwing such earth inwardly, and piling it against the runners, whereby some of the pulverized earth may fall behind said runners around the plants; a transverse bar carried by said runners and extending laterally therefrom, bearing members having upper transverse bearings, lower longitudinal bearings, and intermediate transverse bearings; said upper bearings being mounted upon the ends of said transverse bar, longitudinal arms rotatably mounted in said lower longitudinal bearings, means for rotating said arms including worms mounted in said intermediate bearings, and disks carried by said arms at an angle thereto and adapted first, to return the greater part of the earth to the ridges when initially cultivating; and second, to throw such earth farther onto the row when said disks are inverted by said arms for cultivating the second time.

3. In a lister cultivator, a portable carrying frame including front and rear transverse bars, bearing members having upper transverse bearings, lower longitudinal bearings, and intermediate transverse bearings; said upper bearings being adjustable along and rotatable upon the ends of said bars, longitudinal arms rotatable in said lower longitudinal bearings and carrying angularly arranged disks, means for rotating said arms including worms rotatably mounted in said intermediate bearings, and means for holding said arms in raised or lowered positions.

4. In a lister cultivator, a pair of parallel runners, posts rising rigidly from said runners, front and rear transverse bars carried by said posts and extending laterally from said runners, bearing members having upper transverse bearings, lower longitudinal bearings, and intermediate transverse bearings; said upper bearings being adjustable along and rotatable upon the ends of said bars, longitudinal arms rotatable in said lower longitudinal bearings and carrying angularly arranged disks, means for rotating said arms including worms rotatably mounted in said intermediate bearings, and means for holding said arms in raised or lowered positions.

5. In a lister cultivator, a pair of runners adapted to straddle a row of sprouting plants, means for pulverizing the earth of the ridges alongside the row, throwing such pulverized earth inwardly, and piling it against the runners, whereby some of such earth may fall behind said runners around the plants, and means for returning the remainder of the pulverized earth to the ridges; together with raising and lowering means for said earth returning means, including a longitudinal bar and a control lever for shifting the same, fenders at the rear ends of said runners for controlling the amount of earth falling behind them, raising and lowering means for said fenders including a controlling lever mounted on said longitudinal bar and movable bodily therewith to raise said fenders when said earth returning means is raised, and means for locking said lever to said bar in pivotally adjusted positions.

6. In a cultivator, a carrying frame including a transverse bar, a bearing member having an upper transverse bearing, a lower longitudinal bearing, and an intermediate transverse bearing; said upper bearing being mounted on said transverse bar, a longitudinal arm rotatable in said lower longitudinal bearing and carrying an earth working implement, and means for rotating said arm including a worm mounted in said intermediate bearing.

7. In a cultivator, a carrying frame including a transverse bar and a rock shaft parallel therewith, a slide movable along said bar, an arm extending from said slide and carrying an earth working implement, means for raising and lowering said arm, comprising a second slide on said rock shaft, a crank arm on said second slide, and means connecting said crank arm and said first named arm, connecting means between the two slides for sliding one when the other is so moved, and means for holding one slide normally against sliding movement, whereby the other is also held.

8. In a cultivator, a carrying frame including a transverse bar and a rock shaft parallel therewith, a slide movable along said bar, an arm extending from said slide and carrying an earth working implement, means for raising and lowering said arm, including a second slide on said rock shaft, a pair of vertical ribs on one of said slides and another rib on the other slide received between them, whereby sliding movement of one of said slides will correspondingly move the other, and means for holding one slide against sliding movement, whereby to correspondingly hold the other slide.

9. A disk cultivator including a portable frame, a longitudinally extending implement carrying arm, a bearing carried by said frame and rotatably receiving said arm, a worm-gear fixed on said arm, and a worm mounted on said bearing for coaction with said worm-gear to rotate said arm.

10. A disk cultivator including a portable frame, a bearing pivotally mounted on said frame on an axis transverse to the line of travel thereof, a longitudinal arm rotatably mounted at its front end in said bearing, means carried by said bearing and arm for rotating the latter at will, a second bearing in which the rear portion of said arm is rotatably supported, means for raising and lowering said second bearing, a transverse disk-carrying shaft pivoted for forward and rearward movement on the rear end of said arm, and means for holding said disk-carrying shaft in adjusted position.

In testimony whereof I have hereunto set my hand.

LEWIS JACKSON.

Witness:
T. H. McCall.